UNITED STATES PATENT OFFICE.

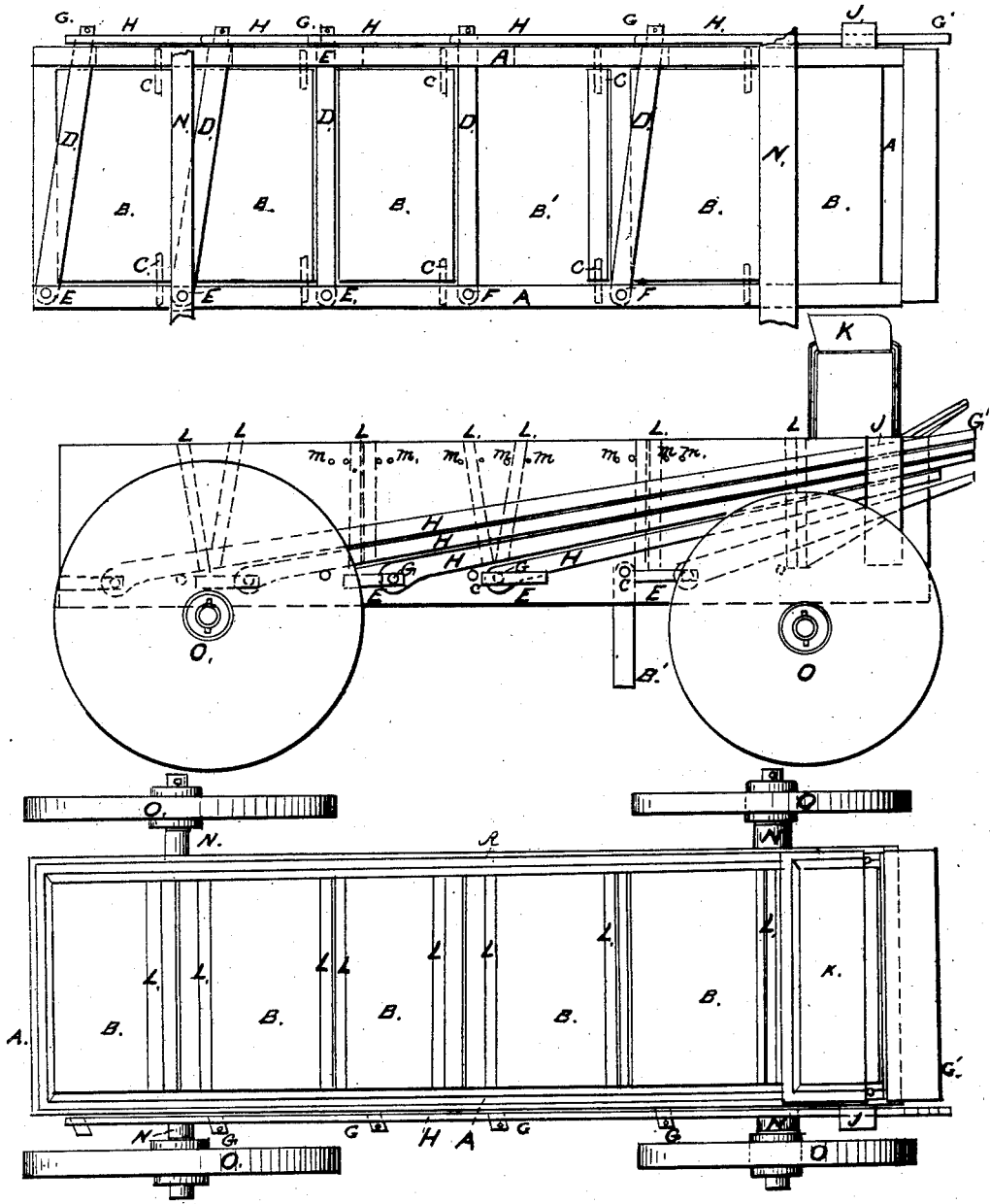

GEO. W. TOLHURST AND DANL. C. SARTWELL, OF LIVERPOOL, OHIO.

DUMPING-WAGON.

Specification of Letters Patent No. 28,216, dated May 8, 1860.

*To all whom it may concern:*

Be it known that we, GEORGE W. TOLHURST and DANIEL C. SARTWELL, of Liverpool, county of Medina, and State of Ohio, have invented a new and Improved Mode of Dumping Manure; and we do hereby declare that the following is a full and exact description thereof, reference being had to the accompanying drawings and to the letters of reference marked thereon.

The nature of our invention will be understood by the specification and claim.

To enable others skilled in the art to make and use our invention we will proceed to describe its construction and operation.

We construct our dumper around the outside similar to a common wagon-box shown in the accompanying drawings at A, Figs. 1, 2, and 3, the bottom of said box being divided into six compartments more or less as the maker may choose best, said compartments being marked, B, Figs. 1, and 3, the bottoms of said compartments being hinged to the sides of the dumper at C, C, C, C, Figs. 1, and 2.

B′ Figs. 1 and 2, are the bottoms opened to more perfectly show their construction. When the dumper is prepared for loading the bottoms are secured in their place by the cross-pieces, D, D, D, D, Fig. 1, being pulled forward under said bottoms each end of said crosspiece being supported by a bar formed in the lower part of the box as shown at E, Figs. 1, and 2, and secured in their place at the end by a pin marked F, F, Fig. 1. The opposite end of said cross-piece passes through a slot of sufficient size and long enough to allow said crosspiece to slide forward under the bottom as shown at D′, Fig. 1. Each crosspiece has one end projecting out from the side of the box or dumper as shown at G, G, G, Figs. 1, 2, and 3. Upon the ends of these crosspieces at G are placed leaders (or connections) marked H, H, Figs. 1, and 2. Said connections extend along the side of the dumper from each crosspiece to the forward part of the foot board marked G′, Figs. 1, 2, and 3, and are there held in a convenient position by the cleat, marked J, Figs. 1, 2, and 3, to be struck by the foot of the driver, or an instrument held in his hand for that purpose. The connections being knocked back throws the crosspieces from under the bottom, causing the bottom to open and dump the contents out at intervals at the will of the operator (or driver) without stopping the team.

K is the driver's seat shown in Figs. 2, and 3.

L, L, L, L, Figs. 2 and 3, are partitions two of which sections form the partitions. The object of making each partition of two sections is to contract the upper part of each compartment so that the article dumped shall readily leave the box as soon as the bottom is let loose, thereby preventing it from being scattered by the motion of the team.

M, M, M, M, are pins which keep the partitions in any desired angle.

N, N, N, N are the axletrees shown in Figs. 1, and 3.

O, O, are the wheels that support the dumper, shafts or pole may be attached to this machine as to any other conveyance as the maker may need.

What we claim as our invention and desire to secure by Letters Patent is—

The combination of the adjustable partitions L, L, L, L, sliding crosspiece D, D, D, D, and side leaders (or connections) H, H, H, H, the whole being arranged and combined for operation as herein described and set forth, not confining ourselves to the number or size of the compartments which contain the manure.

GEORGE W. TOLHURST.
DANIEL C. SARTWELL.

Witnesses:
GEO. TOLHURST,
THOS. DAVIS.